United States Patent
Winter et al.

(10) Patent No.: US 11,953,437 B2
(45) Date of Patent: Apr. 9, 2024

(54) DEVICE AND METHOD FOR MEASURING MULTIPLE ANALYTE CONCENTRATIONS IN A MEASURING MEDIUM

(71) Applicant: SpectraSensors, Inc., Rancho Cucamonga, CA (US)

(72) Inventors: Marc Winter, Gelnhausen (DE); Xiang Liu, Rancho Cucamonga, CA (US); Thomas Wilhelm, Chemnitz (DE)

(73) Assignee: Endress+Hauser Optical Analysis, Inc., Ann Arbor, MI (US)

( * ) Notice: Subject to any disclaimer, the term of this patent is extended or adjusted under 35 U.S.C. 154(b) by 191 days.

(21) Appl. No.: 17/445,880

(22) Filed: Aug. 25, 2021

(65) Prior Publication Data
US 2023/0065553 A1    Mar. 2, 2023

(51) Int. Cl.
*G01N 21/64*    (2006.01)
*G01N 21/17*    (2006.01)
*G01N 21/39*    (2006.01)

(52) U.S. Cl.
CPC ..... *G01N 21/6428* (2013.01); *G01N 21/1702* (2013.01); *G01N 21/39* (2013.01); *G01N 2021/1704* (2013.01); *G01N 2021/1755* (2013.01); *G01N 2021/6432* (2013.01); *G01N 2201/06113* (2013.01); *G01N 2201/12761* (2013.01)

(58) Field of Classification Search
CPC ... G01N 2021/1755; G01N 2021/6432; G01N 2201/12761
See application file for complete search history.

(56) References Cited

U.S. PATENT DOCUMENTS

| | | | | |
|---|---|---|---|---|
| 5,625,189 A | * | 4/1997 | McCaul | G02B 6/4246 250/341.1 |
| 6,873,414 B2 | | 3/2005 | Schueth et al. | |
| 10,076,268 B1 | * | 9/2018 | Dietrich | A61B 5/083 |
| 2002/0026937 A1 | * | 3/2002 | Mault | G01N 33/497 128/200.24 |
| 2008/0127977 A1 | * | 6/2008 | Orr | A61M 16/0858 128/204.22 |
| 2010/0036272 A1 | * | 2/2010 | Mace | A61B 5/087 702/49 |

FOREIGN PATENT DOCUMENTS

EP    3567117 A1    11/2019
JP    0915145 A    1/1997

* cited by examiner

*Primary Examiner* — David P Porta
*Assistant Examiner* — Shun Lee
(74) *Attorney, Agent, or Firm* — Christopher R. Powers; Endress+Hauser (USA) Holding, Inc.

(57) ABSTRACT

The present disclosure relates to a device for measuring a first analyte concentration and a second analyte concentration in a measuring medium, the device including: a sample cell; a first light source unit; a first detector unit; a functional element; a second light source unit; a second detector unit; and a control unit adapted to analyze a detected first light for determining a first value representing the concentration of the first analyte in the measuring medium and adapted to analyze a detected third light for determining a second value representing the concentration of the second analyte in the measuring medium. A method of using the device is also disclosed.

19 Claims, 4 Drawing Sheets

DEVICE AND METHOD FOR MEASURING MULTIPLE ANALYTE CONCENTRATIONS IN A MEASURING MEDIUM

TECHNICAL FIELD

The present disclosure relates to a device for measuring a first analyte concentration and a second analyte concentration in a measuring medium, and a method for measuring a first analyte concentration and a second analyte concentration in a measuring medium.

BACKGROUND

In analytical measurement technology, for example, in the field of industrial hydrogen production, measured variables such as moisture and oxygen content in the produced hydrogen are important parameters for monitoring quality of the production process. These measured variables can be recorded and monitored using, for example, a technique called Tunable Diode Laser Absorption Spectroscopy (TDLAS). However, one disadvantage of TDLAS is that the measurements are less reliable at very low oxygen concentrations, e.g., when there are only traces of oxygen in the measurement medium.

Therefore, there is a need for a device enabling a measurement of moisture and oxygen concentrations even at very low concentrations.

SUMMARY

This objective is met by a device for measuring a first analyte concentration and a second analyte concentration in a measuring medium according to the present disclosure. According to at least one embodiment to the present disclosure, such device comprises: a sample cell for receiving a measuring medium, the sample cell including an inlet, an outlet and a window, wherein the inlet allows for introducing the measuring medium into the sample cell, and the outlet allows for evacuating the measuring medium from the sample cell; a first light source unit being directed to the window for emitting a first light into the sample cell; a first detector unit being directed to the window for detecting the first light exiting the sample cell; a functional element being arranged in the sample cell such that the functional element is in contact with the measuring medium; a second light source unit being directed to the window for emitting a second light on the functional element, wherein the functional element includes a functional layer having luminophores which are adapted to emit a third light upon stimulation with the second light depending on a presence of a second analyte in the measuring medium; a second detector unit being directed to the window for detecting the third light from the functional element; and a control unit for controlling the first light source unit, the first detector unit, the second light source unit and the second detector unit, wherein the control unit is adapted to analyze the detected first light for determining a first value representing the concentration of the first analyte in the measuring medium, and is adapted to analyze the detected third light for determining a second value representing the concentration of the second analyte in the measuring medium.

Among the advantages of devices according to the present disclosure is that oxygen concentrations can be measured even at very low concentrations. The devices provide an integrated, low maintenance solution to measure trace moisture and oxygen in produced hydrogen monitoring hydrogen quality and electrolyzer status on-line.

According to an embodiment of the present disclosure, the first light source unit comprises a tunable laser, and the first light detector unit comprises a Si-photodetector, an InP photodetector, an InGaAs-photodetector, an extended InGaAs-photodetector or an MCT-photodetector.

According to an embodiment of the present disclosure, the first analyte is moisture (e.g., water vapor), and the second analyte is oxygen.

According to an embodiment of the present disclosure, the second light source unit and/or the second light detector unit are connected with the functional element or the window via an optical fiber cable.

According to an embodiment of the present disclosure, the first light source unit comprises at least a first laser configured to generate the first light having a first wavelength, and a second laser configured to generate a fourth light having a second wavelength different from the first wavelength.

According to an embodiment of the present disclosure, the control unit comprises a data storage having a table with reference values for evaluating the detected first light and the detected third light.

According to an embodiment of the present disclosure, the functional element further comprises a protection layer adapted to be permeable to the second analyte and impermeable to certain other analytes.

According to an embodiment of the present disclosure, the functional element further comprises a filter layer adapted to filter light.

The stated objective is also met by a method for measuring a first analyte concentration and a second analyte concentration in a measuring medium according to the present disclosure.

In at least one embodiment according to the present disclosure, such a method comprises the following steps: providing an embodiment of a device according to the present disclosure; emitting the first light into the sample cell by the first light source unit; detecting the first light exiting the sample cell by the first detector unit; evaluating the detected first light by the control unit for determining a first value representing the first analyte concentration in the measuring medium; emitting the second light onto the functional element by the second light source unit such that the luminophores are stimulated by the second light to emit the third light; detecting the third light from the functional element with the second detector unit; and evaluating the detected third light by the control unit for determining a second value representing the second analyte concentration in the measuring medium.

According to an embodiment of the present disclosure, the detection of the first light is performed with an absorption spectroscopy technique.

According to an embodiment of the present disclosure, the measuring of the first analyte concentration and/or the second analyte concentration is performed with a photoacoustic spectroscopy technique, wherein the device further comprises a microphone arranged in the sample cell, wherein the microphone is connected with the control unit.

According to an embodiment of the present disclosure, the first light source unit is configured to generate the first light having a first wavelength and is configured to generate a fourth light having a second wavelength different from the first wavelength, wherein the method further comprises the following steps: emitting the fourth light into the sample cell by the first light source unit; detecting the fourth light exiting the sample cell by the first detector unit; evaluating the detected fourth light by the control unit for determining a third value representing the second analyte concentration in the measuring medium; comparing the second value and the third value by the control unit; and signaling a status of the device based on the comparison step by the control unit.

According to an embodiment of the present disclosure, the first light and the fourth light are each emitted sequentially by the first light source unit.

According to an embodiment of the present disclosure, the light source unit comprises a first laser configured for generating the first light and a second laser configured for generating the fourth light, wherein the first light is emitted by the first laser and the fourth light is simultaneously emitted by the second laser.

According to an embodiment of the present disclosure, the first light and the fourth light are modulated at different frequencies.

According to an embodiment of the present disclosure, in case the comparison step indicates that the second value and the third value are different, the method further comprises the following steps: introducing another medium having an oxygen concentration known to be above 10 ppm into the sample cell; emitting the second light for stimulating the functional element to emit the third light; detecting the third light; evaluating the detected third light to determine a new second value representing the oxygen concentration in the other medium; emitting the fourth light; detecting the fourth light; evaluating the detected fourth light to determine a new third value representing the oxygen concentration in the other medium; comparing the new second value and the new third value; and when the comparing indicates the new second value and the new third are different, evaluating the comparison by promoting the third value.

According to an embodiment of the present disclosure, in case the comparison step indicates that the second value and the third value are not identical, the method further comprises the following steps: introducing a reference medium into the sample cell, wherein the reference medium has a known reference oxygen concentration; emitting the second light for stimulating the functional element to emit the third light; detecting the third light; evaluating the detected third light to determine a new second value representing the known reference oxygen concentration in the reference medium; emitting the fourth light; detecting the fourth light; evaluating the detected fourth light to determine a new third value representing the known reference oxygen concentration in the reference medium; comparing the new second value representing a measured oxygen concentration with the known reference oxygen concentration; comparing the third value representing another measured oxygen concentration with the known reference oxygen concentration; and evaluating the comparison and outputting a status of the device.

The stated objective is also met by a method for measuring a first analyte concentration and a second analyte concentration in a measuring medium according to a further embodiment of the present disclosure, the method comprises the following steps: providing an embodiment of a device according to the present disclosure; emitting the fourth light into the sample cell by the first light source unit; detecting the fourth light exiting the sample cell by the first detector unit; evaluating the detected fourth light by the control unit for determining a third value representing the second analyte concentration in the measuring medium; emitting the second light on the functional element by the second light source unit such that the luminophores are stimulated by the second light to emit the third light; detecting the third light from the functional element with the second detector unit; evaluating the detected third light by the control unit for determining a second value representing the second analyte concentration in the measuring medium; comparing the third value and the second value; and outputting an information about the reliability of the third value.

BRIEF DESCRIPTION OF THE DRAWINGS

The described embodiments and other features, advantages and disclosures contained herein, and the manner of attaining them, will become apparent and the present disclosure will be better understood by reference to the following description of various embodiments of the present disclosure taken in junction with the accompanying drawings, wherein.

DETAILED DESCRIPTION

Figure 1:
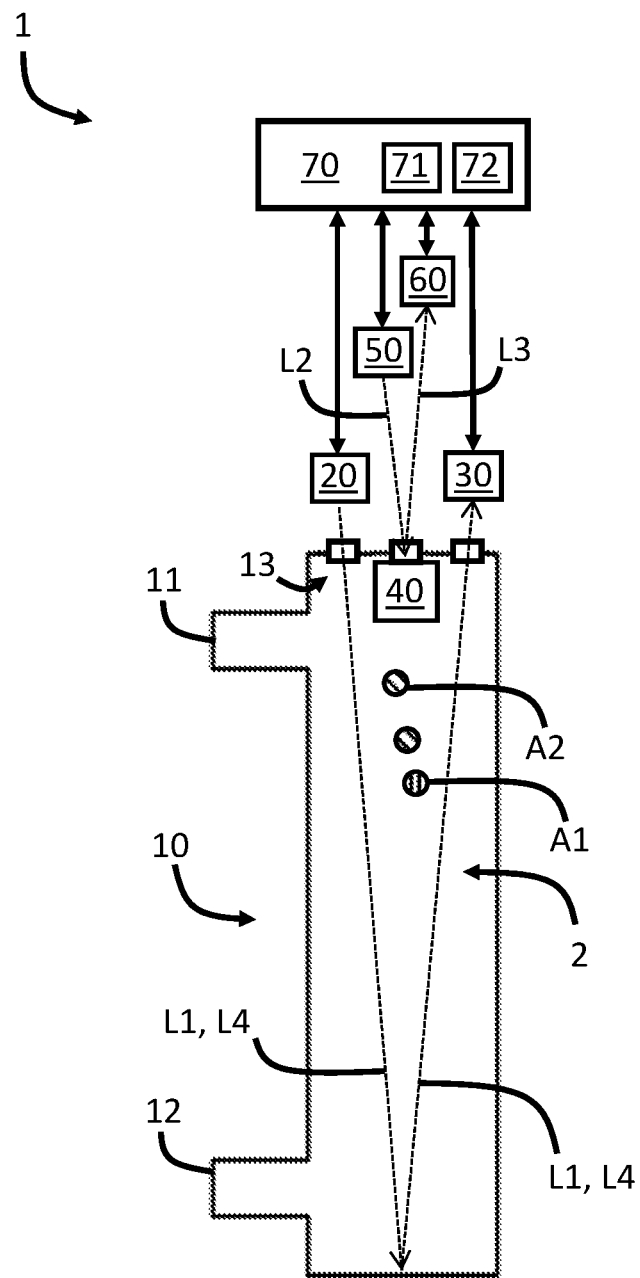
FIG. 1 shows a schematic view of an exemplary embodiment of a device according to the present disclosure.

FIG. 1 shows a first embodiment of a device 1 according to the present disclosure comprising a sample cell 10 with an inlet 11, an outlet 12 and a window 13. The sample cell 10 is, for example, a double pass or multipass cell, e.g., a Herriott cell or another cell. The inlet 11 is adapted to introduce a measuring medium 2 into the sample cell 10. The outlet 12 is adapted to evacuate the measuring medium 2 of the sample cell 10. The measuring medium 2 is, for example, a fluid, such as a gas, in particular hydrogen.

The device 1 further comprises a first light source unit 20, a first detector unit 30, a functional element 40, a second light source unit 50, a second light detector unit 60 and a control unit 70. The control unit 70 comprises a data storage 71 and an output unit 72. The output unit 72 may comprise, as nonlimiting examples, a display, a wireless communication device or another communication device.

Figure 3:
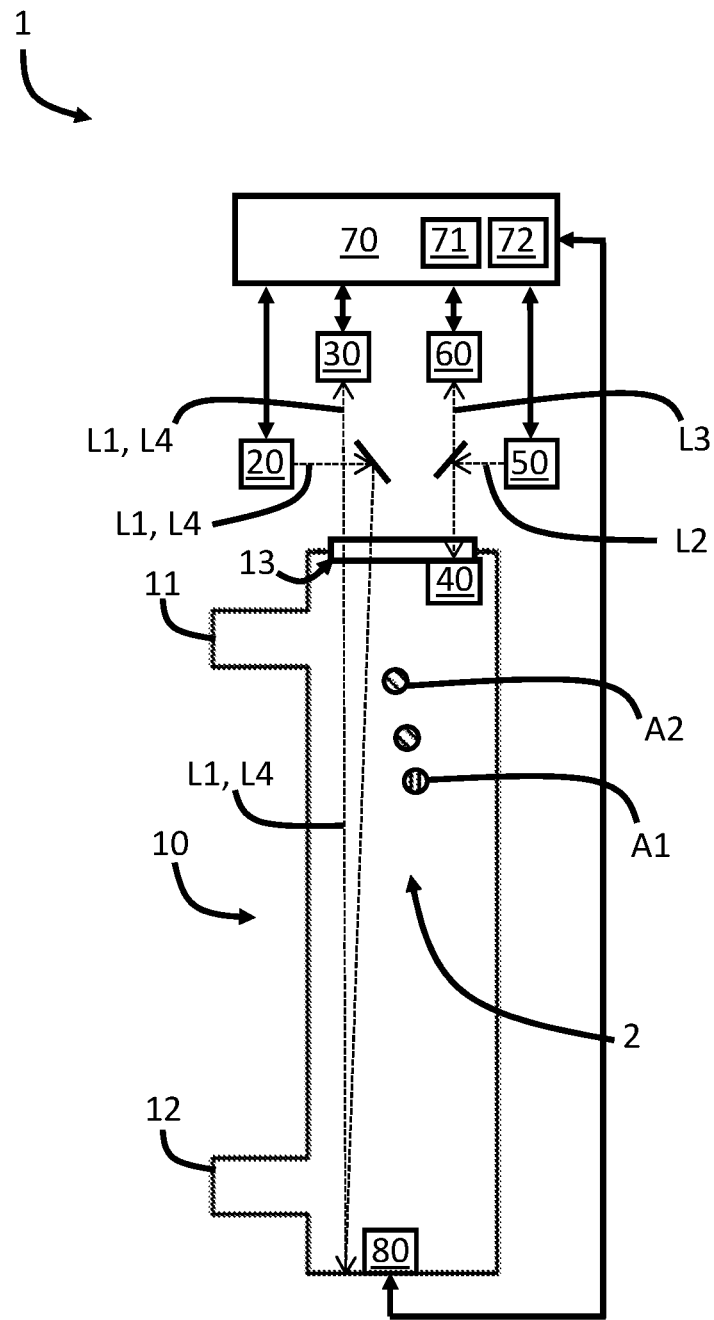
FIG. 3 shows a schematic view of another embodiment of a device according to the present disclosure.

The first light source unit 20 is directed to the window 13 for emitting a first light L1 and a fourth light L4 into the sample cell 10. The window 13 may comprise one single, large transparent portion (e.g., as shown in FIG. 3) or several transparent portions disposed in a wall of the sample cell 10 (e.g., as shown in FIG. 1). The light can be directed to the window 13 without a light guide, as shown in FIG. 1, or with a light guide, e.g., an optical fiber. In such an embodiment, the sample cell 10 may include a hole through which the optical fiber can transmit the light into the sample cell 10. In such an embodiment of an optical fiber introduced in the hole of the sample cell 10 wall, the distal end of the optical fiber can be seen as a type of "window" because the optical fiber is transparent and fills the hole of the sample cell 10. The optical fiber may comprise an optical fiber cable.

The light path of the first light source unit 20 can include mirrors, lens, prisms, optical fiber cables (e.g., glass or polymer), or other optical devices. The window 13 may be adapted with a surface that prevents or mitigates creation of fringes or other optical disturbances. The window 13 has, for example, a wedge-shaped surface.

According to an embodiment, the first light source unit 20 showed in FIG. 1 may comprise a tunable laser. The first light source unit 20 may comprise several LEDs or lasers. The first light source unit 20 is adapted to emit the first light L1 for trace moisture (e.g., water vapor) measurements at a wavelength between 1 micron and 10 microns. In at least one embodiment, the first light source unit 20 is adapted to emit the first light L1 at four wavelength bands, e.g., 1.4 micron (μm), 1.9 μm, 2.7 μm and 6.3 μm. The first light source unit 20 is adapted to emit the fourth light L4 for oxygen measurements at a wavelength between 760 nm and 770 nm, for example, at 761 nm or 763 nm. The first light source unit 20 is adapted for example to emit the first light L1 and fourth light L4 sequentially, e.g., one after the other for alternating measuring trace moisture and oxygen.

According to an alternative embodiment, the first light source unit 20 comprises a single broad band light source, e.g., a tungsten-halogen lamp and an optical filter unit. The filter unit is, e.g., a rotating filter wheel having several filters, according to the selected wavelengths of the first light L1 and the fourth light L4. The lamp in combination with the filter wheel enable the first light source unit 20 to emit light sequentially at different wavelengths for injection into the sample cell 10 at a specific time.

The first light source unit 20 is adapted to modulate the first light L1 and the fourth light L4. Such an embodiment enables wavelength modulation spectroscopy (WMS). In such an embodiment, the first light source unit 20 may be adapted to modulate the driving current of the first light source unit 20, e.g., sinusoidally at a first frequency for modulating the first light L1. The first light source unit 20 may be adapted to modulate the driving current of the first light source unit 20, e.g., sinusoidally at a second frequency for modulating the fourth light L4 at a second frequency. Modulating the driving current according a predefined frequency enables modulation of the light wavelength and light intensity according to the predefined frequency.

The first detector unit 30 is directed to the window 13 for detecting the first light L1 and the fourth light L4, which exit the sample cell 10. The first detector unit 30 can also be optically connected with the window 13 via an optical fiber cable or a similar device. The first light detector unit 30 may comprise, for example, a photodiode and/or a silicon photodetector (Si-photodetector) and/or an indium phosphide photodetector (InP-photodector) and/or an indium gallium arsenide photodetector (InGaAs-photodetector) and/or an extended InGaAs-photodetector and/or a mercury-cadmium-telluride photodetector (MCT-photodetector).

For detection of the first light L1, the first detector unit 30 may comprise an indium phosphide photodiode. For detection of the fourth light L4, the first detector unit 30 may comprise a silicon photodiode. In an embodiment, the device 1 may include two, distinct detectors, and the first light L1 and fourth light L4 may have superposed light paths (as in the example shown in FIG. 1). In such an embodiment, the spatially separation of the first light L1 and the fourth light L4 is performed by beam dispersion optics such as grating or prism in the light path. The two detectors are positioned separately from each other such that one detector will capture the first light L1 and the other detector will capture the fourth light L4.

According to an embodiment compatible with all embodiments of the first detector unit 30, the first detector unit 30 comprises a filter unit for filtering the detected light.

Figure 2:
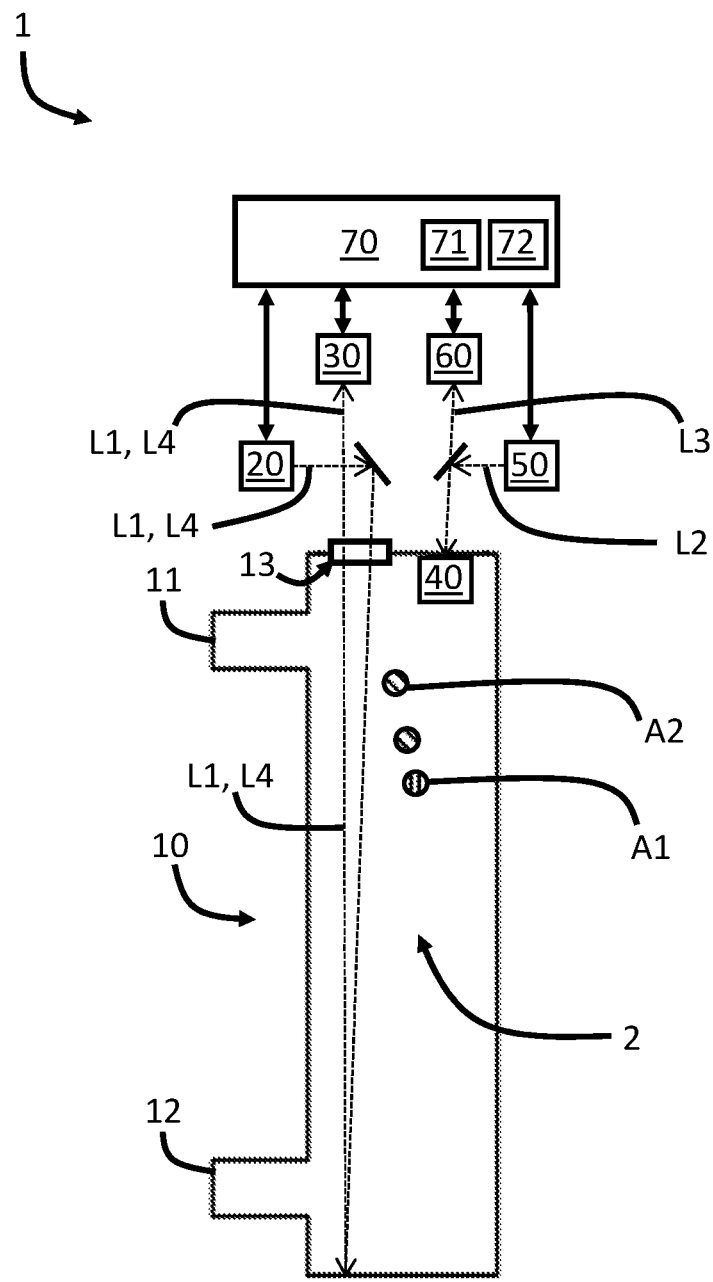
FIG. 2 shows a schematic view of an alternative embodiment of a device according to the present disclosure.

The functional element 40 is arranged in the sample cell 10 such that the functional element 40 is in contact with the measuring medium 2. The functional element 40 can be arranged on the window 13, as shown in FIG. 1. In an alternative embodiment shown in FIG. 2, the functional element 40 is arranged on a side wall of the sample cell 10.

In all embodiments, the functional element 40 may be glued, screwed or fixed with any other convenient, suitable technique inside the sample cell 10 or may be attached to the distal tip of an invasive probe, which penetrates through the sample cell wall, such that the functional element 40 is exposable to the measuring medium 2 and simultaneously exposable to the second light L2.

Figure 4:
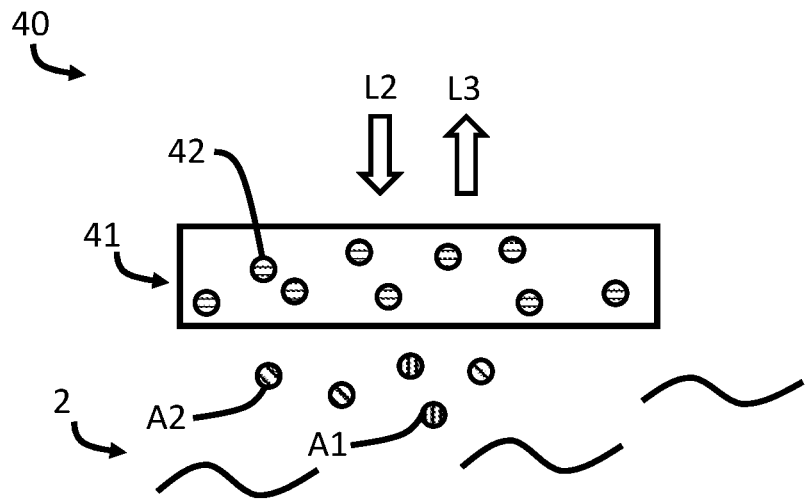
FIG. 4 shows a detailed schematic view of a functional element according to the present disclosure.

FIG. 4 shows a detailed view of one exemplary basic embodiment of the functional element 40, which may be used in all embodiments. The functional element 40 comprises a functional layer 41 having luminophores 42 capable to emit a third light L3 upon stimulation with the second light L2. The functional layer 41 is permeable to gas. The luminophores 42 are, for example, fluorophores such as ruthenium, palladium or platinum complexes. The wavelength at which the luminophores 42 receive a maximum of stimulation is, for example, between 500 nm and 1000 nm, for example, at 610 nm or 505 nm.

The luminophores 42 of the functional element 40 are sensitive to the presence of a second analyte A2. The second analyte A2 is oxygen. In case oxygen is present in the measuring medium 2, the third light L3 emitted by the luminophores 42 is less intensive and decays faster than in case there is no oxygen present in the measuring medium 2. This effect on the luminophores 42 is called quenching.

Figure 5:
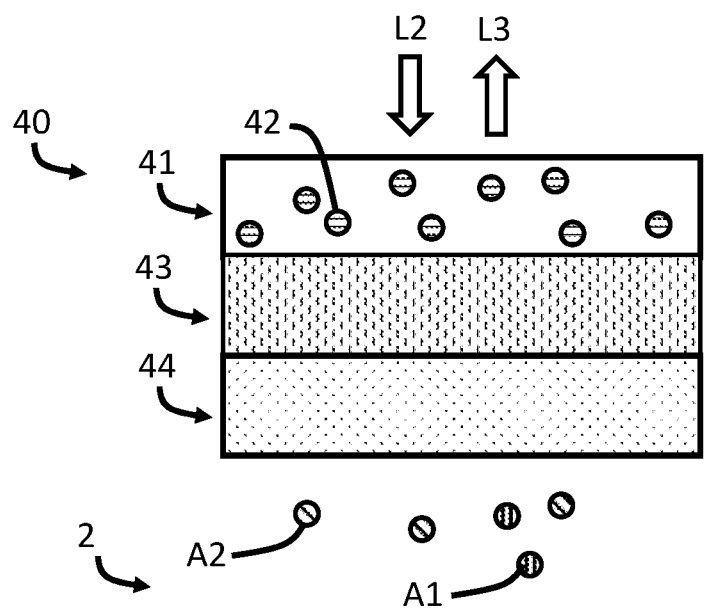
FIG. 5 shows a detailed schematic view of an alternative embodiment of a functional element according to the present disclosure.

FIG. 5 shows a detailed view of an alternative embodiment of the functional element 40. In this embodiment, a protection layer 43 is arranged on the functional layer 41. The protection layer 43 is permeable to oxygen and impermeable to several analytes that are harmful to the luminophores. For example, the protection layer 43 is impermeable for liquids and permeable to certain gases. Harmful analytes may be organic compounds or chlorides causing chemical bleaching of the luminophores. Thus, the protection layer 43 protects against destruction of the luminophores. The protection layer 43 is, for example, a membrane. The protection layer 43 may be transparent.

The functional element 40 may further comprise a filter layer 44 adapted to filter light having a non-desired wavelength. The filter layer 44 may be a black layer to protect the luminophore dye from environmental light. The black dye of the filter layer 44 may be carbon black or soot. The filter layer 44 reduces destruction of the luminophores 42 by photobleaching. The filter layer 44 is impermeable to liquids, e.g., condensed moisture, but is permeable to gas. According to an embodiment (not shown), the filter layer 44 and the protection layer 43 can be combined in one single layer.

Certain embodiments of the functional element may not include the filter layer 44, for example, in embodiments in which the light source unit 20 is a laser, e.g., having a narrow wavelength range outside the wavelength range for stimulating the luminophores 42 and if no other light impinges on the functional element 40. The filter layer 44 may be partially omitted, for example, in embodiments in which stimulation of the functional element 40 is performed from the outside of the sample cell 10, e.g., without that the second light L2 passes through the sample cell 10. The side of the functional element 40 that is exposed to the measuring medium 2 and the first light L1 and/or fourth light L4 may still be covered with a filter layer 44.

In embodiments in which the functional element 40 is arranged on the window 13, as shown in FIG. 1, the filter layer 44 can be arranged on a side of the functional layer 41 opposite to the side of the functional layer 41 on which impinges the second light L2, as shown in FIG. 5. In such an embodiment, the filter layer 44 can be adapted to block any light, independent of its wavelength.

The second light source unit 50 is optically connected to the window 13 and arranged such that a second light L2 is emitted onto (e.g., irradiates) the functional element 40. The second light source unit 50 is, for example, a laser or a LED emitting the second light L2 at a wavelength at 505 nm, or between 600 nm and 1000 nm, for example, at 610 nm. The second light L2 can be guided to the sample cell 10 via optical devices including mirrors, glass fiber cable and other optical devices.

The second detector unit 60 is directed to the window 13 for detecting the third light L3 from the functional element 40. The second light detector unit 60 may comprise filter elements like wavelength selective mirrors, grating elements or other filter elements. In an alternative embodiment, the second light detector unit 60 may comprise a photodiode which is sensitive only to a predefined wavelength, which allows for color filtering directly at the photodiode.

The control unit 70 is connected to the first light source unit 20, the first detector unit 30, the second light source unit 50 and the second light detector unit 60 to control the light emission and detection. The control unit 70 may be configured to perform certain operations comprising a control structure to provide the functions described herein. In certain embodiments, the control unit 70 forms a portion of a processing subsystem that includes one or more computing devices having memory, processing, and/or communication hardware. The control unit 70 may be a single device or a distributed device, and the functions of the control unit 70 may be performed by hardware and/or software. The control unit 70 can include one or more Arithmetic Logic Units (ALUs), Central Processing Units (CPUs), memories, limiters, conditioners, filters, format converters, or the like which are not shown to preserve clarity. In at least one embodiment, the control unit 70 is programmable to execute algorithms and process data in accordance with operating logic that is defined by programming instructions, such as software or firmware. Alternatively or additionally, operating logic for the control unit 70 can be at least partially defined by hardwired logic or other hardware, for example, using an Application-Specific Integrated Circuit (ASIC) of any suitable type. The control unit 70 can be exclusively dedicated to the functions described herein or may be further used in the regulation, control, and activation of one or more other subsystems or aspects of the device 1.

The control unit 70 is configured to analyze the detected first light L1 for determining a first value representing a first analyte A1 concentration, e.g., moisture concentration, in the measuring medium 2. The first analyte A1 concentration is moisture. The control unit 70 is further configured to analyze the detected third light L3 for determining a second value representing the second analyte A2 concentration, e.g., oxygen concentration, in the measuring medium 2. The control unit 70 is further configured to analyze the detected fourth light L4 for determining a third value representing the second analyte A2 concentration, e.g., oxygen concentration, in the measuring medium 2.

FIG. 3 shows an alternative embodiment of the device 1, including a microphone 80 arranged in the sample cell 10. The microphone 80 is connected with the control unit 70. The microphone 80 enables photoacoustic spectroscopy measurement of analyte A1 and/or A2 using light L1 and/or L4. In this embodiment, the control unit 70 may comprise a lock-in amplifier for amplification of the signal detected by the microphone 80.

In an embodiment in which only the second analyte A2, e.g., oxygen, shall be measured, the first light source unit 20 can be selected such that only the fourth light L4 can be emitted, and the first detector unit 30 can be selected such that only the fourth light L4 can be detected. Of course, the device 1 also can be used only for the detection of one analyte. In such an embodiment, components of the device 1 that are not necessary for the detection of this one analyte can be omitted.

In another aspect of the present disclosure, a method for measuring a first analyte concentration and a second analyte A2 concentration in the measuring medium 2 includes the following. In a first step, the device 1 according to one embodiment as described above is provided. The device 1 is filled with a measuring medium 2 which enters the sample cell 10 at the inlet 11 and exits the sample cell 10 at the outlet 12. The measuring medium 2 is hydrogen. The hydrogen is, for example, produced with an electrolyzer.

In a next step, the first light L1 is emitted into the sample cell 10 by the first light source unit 20. As shown in FIG. 1, the first light L1 enters the sample cell 10 at the window 13, traverses the sample cell 10 and exits the sample cell 10 again at the window 13. In case the sample cell 10 has multiple windows (or multiple window sections), the first light L1 may of course exit at another window (or another window section) as the window at which the light has entered the sample cell 10. As mentioned above, a light guide can be used to guide the first light L1 into the sample cell 10. When the first light L1 encounters the measuring medium 2, the light properties, e.g., the intensity will be influenced due to scattering, reflection and absorption depending on the composition of the measuring medium 2.

The first light L1 exiting the sample cell 10 is then detected by the first detector unit 30. As mentioned above, according to an embodiment, the first detector unit 30 comprises at least one light filter. In this case, the first light L1 is filtered such that only light having a specific wavelength is detected by the first detector unit 30. In an alternative embodiment, the first detector unit 30 detects light having a large wavelength range and an optional filtering of at least one specific wavelength is performed after the detection during the subsequent evaluation step by the control unit 70.

In a subsequent step the detected first light L1 is evaluated by the control unit 70. The control unit 70 determines a first value representing the first analyte A1, e.g., moisture, concentration in the measuring medium 2. This determination is performed, for example, based on an equation stored in the data storage 71 of the control unit 70. The equation takes the measured intensities at different wavelength into account for determining the concentration of the first analyte A1. Alternatively, the determination is performed by a comparison of the detected light intensity within a table storied in the data storage 71 of the control unit 70. The table comprises different theoretical intensities of the first light L1 and the corresponding concentrations of the first analyte A1. The evaluation step optionally comprises a correction of the first light L1. Such a correction may use a direct current component of the detected first light L1 to normalize the second harmonic component of the detected first light L1, to eliminate any non-resonant laser attenuation.

In an optional step, the first value representing the first analyte concentration in the measuring medium 2 is output via the output unit 72. The first value is, e.g., displayed on the display internal to the device 1 or is send by wireless communication to an external device.

In a following step, the second light L2 is emitted by the second light source unit 50 onto the functional element 40. The second light L2 is emitted such that the luminophores 42 are stimulated by the second light L2. The second light L2 has a predefined wavelength, which matches the stimulation wavelength of the luminophores 42. As described above, the wavelength is, e.g., 610 nm. The third light L3 is emitted by the luminophores 42 upon stimulation with the second light L2. The wavelength of the third light L3 is longer than the wavelength of the second light L2, e.g., at a wavelength higher than 650 nm.

In a subsequent step, the third light L3 emitted from the functional element 40 is detected with the second detector unit 60. The second light detector unit 60 can comprise a filter for filtering light such that the second light detector unit 60 detects only light having a predefined wavelength corresponding to the third light L3.

Afterwards, the detected third light L3 is evaluated by the control unit 70. The control unit 70 determines a second value representing the second analyte A2 concentration in the measuring medium 2. This determination is performed, for example, based on an equation stored in the data storage 71 of the control unit 70. The equation use the measured intensities and/or the decay times for determining the concentration of the second analyte A2. Alternatively, the determination is performed by a comparison of the detected light intensity and/or the decay times within a table stored in the data storage 71 of the control unit 70. The table comprises different reference values, e.g., theoretical intensities and/or the decay times of the third light L3 and the corresponding concentrations of the second analyte A2. This table can also be modified in a separate calibration step when the sensor element 40 is exposed to at least one known A2 concentration and a corresponding signal is being recorded.

Other properties of the third light L3, which may change as a function of A2 concentration and be evaluated for the purpose of calculating said concentration, include the phase or the decay time of the fluorescence signal.

In an optional step, the second value representing the second analyte A2 concentration in the measuring medium 2 is output at the output unit 72.

According to a further embodiment, the method further comprises the following steps. First, the fourth light L4 is emitted into the sample cell 10 by the first light source unit 20. The wavelength of the fourth light L4 is different from the wavelength of the first light L1. For example, the wavelength of the fourth light L4 is 761 nm. Due to this specific wavelength, the fourth light L4 interacts particularly with oxygen when oxygen is present in the measuring medium 2. The interaction is scattering, absorption or reflection of the fourth light L4.

Second, the fourth light L4 exiting the sample cell 10 is detected by the first detector unit 30. Third, the detected fourth light L4 is evaluated by the control unit 70 for determining a third value representing the second analyte A2, e.g., oxygen concentration, in the measuring medium 2. When oxygen is present in the measuring medium 2, the intensity of the detected fourth light L4 is lower than in case there is no oxygen present in the measuring medium 2.

Fourth, the second value and the third value are compared by the control unit 70. As mentioned above, the second value represents the oxygen concentration in the measuring medium 2 based on a quenched fluorescence measurement. The third value represents the oxygen concentration in the measuring medium 2 based on a tunable laser diode absorption spectroscopy measurement. In case the second value and the third value are identical or at least nearly identical, the status of the device 1 is "normal." This means the oxygen level is reliably detected with both techniques, i.e., quenched fluorescence and TDLAS. The status of the device 1 is optionally output via the output unit 72.

This supplementary determination of the oxygen concentration based on the tunable laser diode absorption spectroscopy technique allows for a reality check of the device 1.

In case the second value and the third value are different from each other, the control unit 70 evaluates the concentration level of the second analyte A2, e.g., oxygen, which is represented by the second value and the third value.

In case the oxygen concentration is very low, e.g., below 10 ppm, the control unit 70 promotes the second value, e.g., the value obtained using the functional element 40. In an embodiment, promoting the second value may include recommending to a user to trust the second value over the third value. In another embodiment, promoting the second value may include outputting or recording only the second value to the user and omitting the third value. As a nonlimiting example, the status of the device 1 may be: "Attention: very low oxygen level—second value more reliable." In case oxygen concentration is higher than 10 ppm, the status of the device 1 may be: "Attention: there is a problem with the measuring device." In such a case, the control unit 70 recommends a user to verify the device 1. In particular, the recommendation comprises a suggestion to introduce a gas having known oxygen concentration for discerning which of the second value or the third value is not correct.

Fifth, the status of the device 1 based on the comparison step is signaled by the control unit 70. The signaling is performed, for example, by displaying a message on the output unit 72 or by sending the status to, e.g., an external device via wireless communication.

The steps of the above method for determining a first value representing the first analyte, e.g., moisture, are of course not necessary to perform where only the second analyte, e.g., oxygen, is relevant for a user.

The above method steps for determining a first value representing the first analyte, e.g., moisture, and the above method steps for determining the third value, representing the second analyte, e.g., oxygen, are respectively performed with an absorption spectroscopy technique. However, it is possible to perform these steps using a photoacoustic spectroscopy technique. In embodiments in which the photoacoustic spectroscopy technique is used, the measurement from the microphone 80, arranged in the sample cell 10 are evaluated by the control unit 70. In such a photoacoustic method, the microphone 80 is used to detect the acoustics generated due to light absorption. The detection of the first light L1 is used for reference to correct the laser intensity change overtime.

Based on the first value, second value and/or third value, the production process of the measuring medium 2, e.g., hydrogen, can be controlled by the control unit 70.

A predefined threshold may be defined beforehand depending on an operation mode of the electrolyzer. The user may specify a first threshold dependent on the production requirements.

By setting predefined thresholds at one or more concentration levels for moisture and/or oxygen, the control unit 70 can detect process states in which moisture or oxygen or a combination of both exceed one or more respective predefined thresholds. The control unit 70 enables mapping of the respective events like, e.g.: moisture above a first threshold level, and moisture above a first threshold level and oxygen above a second threshold level. This allows the control unit 70 to emit status messages in many ways: the message can be shown, e.g., on the display of the output unit 72, or a status flag can be sent from the control unit 70 via a digital output line or via a Modbus to an external reception station, or the control unit 70 can set a field bus register to a certain value. This enables a user to be informed about detection of moisture higher than an allowed threshold. The message may also comprise an indication of possible causes for the present process state, e.g., the moisture concentration is above the predefined threshold because a drier may not be working correctly.

In case high concentration of moisture, e.g., higher than the predefined first threshold, is detected and high concentration of oxygen, e.g., higher than a predetermined second threshold, is detected, it is highly probable that there is a leakage of the hydrogen production system to the environment. For example, a tube may be perforated such that air is entering into the production system. In such a case, the control unit 70 can output on the output unit 72 the information, for example, "Attention: high moisture level and high oxygen level detected. Please verify the sealing of the production system."

In case high concentration of oxygen, e.g., higher than the predetermined second threshold, is detected, it is highly probable that the sample cell 10 still contains air after a maintenance action. For example, where the user had opened the sample cell 10 for a maintenance action, like replacement of the functional element 40 or a window 13, but has not yet rinsed the sample cell 10 with the measuring medium 2 or another fluid, the sample cell 10 may still contain air, which is in turn detected by the device 1. In such a case, the control unit 70 can output on the output unit 72 the information, for example, "Attention: high oxygen level detected. Please verify if the sample cell 10 has been flushed successfully with a fluid to evacuate air."

Based on the above-mentioned verification method, the control unit 70 even allows verification of the hydrogen production process.

According to an embodiment, a method step compatible with all above-mentioned method steps includes flushing the sample cell 10 with validation gas samples having a significant amount of oxygen, e.g., lower than the second threshold. Then a first reference measurement is performed with the first light source unit 20 emitting the fourth light L4 and the first detector unit 30 detecting the fourth light L4. Then a second reference measurement is performed with the second light source unit 50 emitting the second light L4 and the second detector unit 60 detecting the third light L3 emitted by the functional element 40. Subsequently, the control unit 70 evaluates the measurements. The two measurements are compared to each other for a validity check. A calibration step may optionally follow the evaluation step.

The device 1 enables higher sensitivity for oxygen measurement because of the sensitivity of QF LDL, which is parts per million (ppm) or even sub-ppm. Given a combination of TDLAS and QF, a full range measurement of oxygen is obtained, which is about 0-1000 ppm. The device 1 enables increasing the measuring range and for a plausibility check of the measurement results. In other words, the device 1 allows for an increase in quantity, e.g., measurement range and quality, e.g., reality check of the device 1 and the hydrogen production process.

While various embodiments of an analysis device and methods for using and constructing the same have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure. The present disclosure is not intended to be exhaustive or to limit the scope of the subject matter of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible and thus remain within the scope of the present disclosure.

The invention claimed is:

1. A method for measuring a first analyte concentration and a second analyte concentration in a measuring medium, the method comprising:
    providing a device comprising:
        a sample cell adapted to receive the measuring medium;
        a first light source unit configured to emit a first light at a first wavelength and a fourth light at a second wavelength different from the first wavelength;
        a first detector unit configured to detect the first light and the fourth light;
        a functional element disposed within the sample cell such that the functional element is in contact with the measuring medium;
        a second light source unit configured to emit a second light, wherein the functional element comprises luminophores adapted to emit a third light upon stimulation by the second light, the third light depending on a presence of the second analyte in the measuring medium;
        a second detector unit configured to detect the third light from the functional element; and
        a control unit configured to operate on the detected first light, third light and fourth light;
    emitting the first light from the first light source unit into the sample cell;
    detecting the first light exiting the sample cell using the first detector unit;
    evaluating the detected first light using the control unit to determine a first value representing the first analyte concentration in the measuring medium;
    emitting the second light from the second light source unit onto the functional element such that the luminophores are stimulated by the second light to emit the third light;
    detecting the third light from the functional element using the second detector unit;
    evaluating the detected third light using the control unit to determine a second value representing the second analyte concentration in the measuring medium;
    emitting the fourth light from the first light source unit into the sample cell;
    detecting the fourth light exiting the sample cell using the first detector unit;
    evaluating the detected fourth light using the control unit to determine a third value representing the second analyte concentration in the measuring medium;
    comparing the second value and the third value using the control unit; and
    signaling a status of the device using the control unit based on the comparing of the second value and the third value.

2. The method of claim 1, wherein the first light detector unit comprises a silicon photodetector, an indium phosphide photodetector, an indium gallium arsenide photodetector, an extended indium gallium arsenide photodetector or a mercury-cadmium-telluride photodetector.

3. The method of claim 1, wherein the first analyte is moisture, and the second analyte is oxygen.

4. The method of claim 1, wherein the second light source unit and/or the second light detector unit are connected with the functional element or a window of the sample cell via an optical fiber.

5. The method of claim 1, wherein the first light source unit comprises at least a first laser configured to generate the first light having the first wavelength, and a second laser configured to generate the fourth light having the second wavelength different from the first wavelength.

6. The method of claim 1, wherein the control unit comprises a data storage including a table with reference values for evaluating the detected first light and the detected third light.

7. The method of claim 1, wherein the functional element further comprises a protection layer configured to be permeable to the second analyte and impermeable to certain other analytes.

8. The method of claim 1, wherein the functional element further comprises a filter layer configured to filter light.

9. The method of claim 1, wherein the detecting of the first light and the fourth light is performed with an absorption spectroscopy technique.

10. The method of claim 1, wherein the first light and the fourth light are emitted sequentially by the first light source unit.

11. The method of claim 1, wherein the first light source unit comprises a first laser configured to emit the first light and a second laser configured to emit the fourth light, wherein the first light is emitted by the first laser and the fourth light is simultaneously emitted by the second laser.

12. The method of claim 1, wherein the first light and the fourth light are modulated at different frequencies.

13. The method of claim 1, wherein, when the comparing of the second value and the third value indicates the second value and the third value are different, the method further comprises:
  introducing another medium having an oxygen concentration above 10 ppm into the sample cell;
  emitting the second light onto the functional element as to stimulate the functional element to emit the third light;
  detecting the third light;
  evaluating the detected third light to determine a new second value representing the oxygen concentration in the other medium;
  emitting the fourth light;
  detecting the fourth light;
  evaluating the detected fourth light to determine a new third value representing the oxygen concentration in the other medium;
  comparing the new second value and the new third value; and
  when the comparing indicates the new second value and the new third are different, evaluating the comparison by promoting the third value.

14. The method of claim 1, wherein, when the comparing of the second value and the third value shows that the second value and the third value are different, the method further comprises:
  introducing a reference medium into the sample cell, wherein the reference medium has a known reference oxygen concentration;
  emitting the second light as to stimulate the functional element to emit the third light;
  detecting the third light;
  evaluating the detected third light to determine a new second value representing the known reference oxygen concentration in the reference medium;
  emitting the fourth light;
  detecting the fourth light;
  evaluating the detected fourth light to determine a new third value representing the known reference oxygen concentration in the reference medium;
  comparing the new second value representing a measured oxygen concentration with the known reference oxygen concentration of the reference medium;
  comparing the new third value representing another measured oxygen concentration with the known reference oxygen concentration; and
  evaluating the comparison and outputting a status of the device.

15. The method of claim 1, wherein the first light source unit comprises a tunable laser.

16. The method of claim 1, wherein the first detector unit and the second detector unit each include a respective light filter.

17. The method of claim 1, wherein control unit is configured to control the first light source unit, the first detector unit, the second light source unit and the second detector unit, and wherein the control unit is configured to analyze the detected first light to determine the first value representing the first analyte concentration, to analyze the detected third light to determine the second value representing the second analyte concentration, and to analyze the detected fourth light to determine the third value representing the second analyte concentration.

18. The method of claim 1, wherein the sample cell includes one or more windows via which the first light, second light and fourth light are emitted into the sample cell and via which the first light, third light and fourth light exit the sample cell, and wherein the sample cell includes an inlet and an outlet, wherein the inlet is configured to enable introducing the measuring medium into the sample cell, and the outlet is configured to enable evacuating the measuring medium from the sample cell.

19. A method for verifying a measured second analyte concentration in a measuring medium, the method comprising:
  providing a device comprising:
    a sample cell adapted to receive the measuring medium;
    a first light source unit configured to emit a first light at a first wavelength and a fourth light at a second wavelength different from the first wavelength into the sample cell;
    a first detector unit configured to detect the first light and the fourth light exiting the sample cell;
    a functional element disposed within the sample cell such that the functional element is in contact with the measuring medium;
    a second light source unit configured to emit a second light onto the functional element, wherein the functional element comprises luminophores adapted to emit a third light upon stimulation by the second light, the third light dependent on a presence of a second analyte in the measuring medium;

a second detector unit configured to detect the third light from the functional element; and a control unit configured to operate on the detected first light, third light and fourth light;

emitting the fourth light using the first light source unit into the sample cell;

detecting the fourth light exiting the sample cell by the first detector unit;

evaluating the detected fourth light using the control unit to determine a third value representing the second analyte concentration in the measuring medium;

emitting the second light from the second light source unit onto the functional element such that the luminophores are stimulated by the second light to emit the third light;

detecting the third light from the functional element using the second detector unit;

evaluating the detected third light by the control unit to determine a second value representing the second analyte concentration in the measuring medium;

comparing the third value and the second value; and outputting information about the reliability of the third value based on the comparing.

* * * * *